(12) United States Patent
Chida et al.

(10) Patent No.: US 10,075,661 B2
(45) Date of Patent: Sep. 11, 2018

(54) IMAGE PROCESSING APPARATUS, IMAGE PROCESSING METHOD, AND IMAGE CAPTURING APPARATUS

(71) Applicant: SONY CORPORATION, Tokyo (JP)

(72) Inventors: Keisuke Chida, Saitama (JP); Kazunori Kamio, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/554,908

(22) PCT Filed: Dec. 16, 2015

(86) PCT No.: PCT/JP2015/085202
§ 371 (c)(1),
(2) Date: Aug. 31, 2017

(87) PCT Pub. No.: WO2016/147508
PCT Pub. Date: Sep. 22, 2016

(65) Prior Publication Data
US 2018/0084210 A1  Mar. 22, 2018

(30) Foreign Application Priority Data
Mar. 18, 2015 (JP) .................................. 2015-054723

(51) Int. Cl.
*H04N 5/367* (2011.01)
*H04N 5/378* (2011.01)
(Continued)

(52) U.S. Cl.
CPC ............. *H04N 5/367* (2013.01); *H04N 5/341* (2013.01); *H04N 5/351* (2013.01); *H04N 5/3698* (2013.01); *H04N 5/378* (2013.01)

(58) Field of Classification Search
CPC ........ H04N 5/232; H04N 5/225; H04N 5/367; H04N 5/341; H04N 5/351; H04N 5/3698; H04N 5/378
(Continued)

(56) References Cited

U.S. PATENT DOCUMENTS 6,356,276 B1 * 3/2002 Acharya ............... G06T 3/4015
345/427
6,580,837 B1 * 6/2003 Johnson ................... G06T 3/40
345/606
(Continued)

FOREIGN PATENT DOCUMENTS

CN          101018299 A     8/2007
JP          2005-80198 A    3/2005
(Continued)

OTHER PUBLICATIONS

International Search Report and Written Opinion of PCT Application No. PCT/JP2015/085202, dated Mar. 8, 2016, 08 pages of ISRWO.

*Primary Examiner* — Antoinette Spinks
(74) *Attorney, Agent, or Firm* — Chip Law Group

(57) ABSTRACT

An interpolation processing unit 31 performs an interpolation process of a decimated pixel in an image signal. A signal generation pixel determination unit 32 calculates a feature value of a pixel of interest from the image signal to which the interpolation process is performed by the interpolation processing unit 31, and determines whether the pixel of interest is a decimated pixel or a non-decimated pixel on the basis of the calculated feature value, and generates signal generation pixel determination information indicating a determination result. A signal generation control unit 34 performs control to stop signal generation operation of the pixel that is determined to be the decimated pixel by the signal generation pixel determination information generated
(Continued)

by the signal generation pixel determination unit 32, at a time of subsequent generation of an image signal. The degradation of image quality is prevented, and the electric power consumption is reduced, by performing decimation in a flat image region on the basis of a feature value.

20 Claims, 10 Drawing Sheets

(51) Int. Cl.
  *H04N 5/351*  (2011.01)
  *H04N 5/341*  (2011.01)
  *H04N 5/369*  (2011.01)

(58) Field of Classification Search
  USPC .......................................................... 348/246
  See application file for complete search history.

(56) References Cited

U.S. PATENT DOCUMENTS

| | | | | |
|---|---|---|---|---|
| 2006/0055794 | A1* | 3/2006 | Sato | H04N 3/1562 348/222.1 |
| 2006/0077470 | A1* | 4/2006 | Saquib | G06T 5/004 358/3.28 |
| 2007/0181687 | A1 | 8/2007 | Fukushima et al. | |
| 2009/0237549 | A1* | 9/2009 | Amano | H04N 1/387 348/333.12 |
| 2010/0158405 | A1* | 6/2010 | Kempf | G06T 3/0093 382/260 |
| 2011/0286011 | A1* | 11/2011 | Shoji | H04N 1/3935 358/1.1 |
| 2014/0092273 | A1* | 4/2014 | Mizoguchi | H04N 5/225 348/222.1 |
| 2017/0311927 | A1* | 11/2017 | Yao | A61B 8/08 |

FOREIGN PATENT DOCUMENTS

| | | |
|---|---|---|
| JP | 2007-150439 A | 6/2007 |
| JP | 2007-243909 A | 9/2007 |
| JP | 2010-091985 A | 4/2010 |
| JP | 2011-081576 A | 4/2011 |
| JP | 4952498 B2 | 6/2012 |

\* cited by examiner

FIG. 3

| R | G | R | G | R | G | R |
|---|---|---|---|---|---|---|
| G | B | G | B | G | B | G |
| R | G | R | G | R | G | R |
| G | B | G | B | G | B | G |
| R | G | R | G | R | G | R |
| G | B | G | B | G | B | G |
| R | G | R | G | R | G | R |

FIG. 5

| R | G | R | G | R | G | R |
| G | B | G | B | G | B | G |
| R | G | R | G | R | G | R |
| G | B | G | B | G | B | G |
| R | G | R | G | R | G | R |
| G | B | G | B | G | B | G |
| R | G | R | G | R | G | R |

| 0 | 1 |
|---|---|

FIG. 10(a)

| 0 | 0.33 | 0.66 | 1 |
|---|------|------|---|

FIG. 10(b)

| 0 | 0 | 1 | 1 |
|---|---|---|---|

FIG. 10(c)

IMAGE PROCESSING APPARATUS, IMAGE PROCESSING METHOD, AND IMAGE CAPTURING APPARATUS

CROSS REFERENCE TO RELATED APPLICATIONS

This application is a U.S. National Phase of International Patent Application No. PCT/JP2015/085202 filed on Dec. 16, 2015, which claims priority benefit of Japanese Patent Application No. JP 2015-054723 filed in the Japan Patent Office on Mar. 18, 2015. Each of the above-referenced applications is hereby incorporated herein by reference in its entirety.

TECHNICAL FIELD

This technology relates to an image processing apparatus, an image processing method, and an image capturing apparatus, and prevents degradation of image quality and reduces electric power consumption.

BACKGROUND ART

An image capturing apparatus uses a complementary metal oxide semiconductor (CMOS) image sensor or a charge coupled device (CCD) image sensor, and the number of pixels of the image sensor is being increased to acquire a high-definition captured image. Hence, electric power consumption increases as the number of pixels increases, in a drive circuit and a signal processing circuit of the image sensor.

Hence, for example, in Patent Literature 1, decimation is performed by summing a plurality of pixels to generate one pixel at the image sensor at the time of capturing a moving image, in order to reduce the electric power consumption. Also, in Patent Literature 2, a plurality of operation modes of an analog/digital (A/D) conversion process are prepared, and the operation mode of the minimum power consumption is selected on the basis of pixel information given in advance.

CITATION LIST

Patent Literature

Patent Literature 1: JP 2007-150439A
Patent Literature 2: JP 4952498B

DISCLOSURE OF INVENTION

Technical Problem

By the way, when decimation is performed to reduce the electric power consumption, the number of pixels of an image becomes smaller, and thus it is necessary to perform up-conversion to acquire the image having the number of pixels before decimation. However, in the decimation in which a plurality of pixels are summed to generate one pixel, a new pixel is generated by averaging a plurality of pixels, and thereby a high frequency component is lost in some cases. Also, when the pixels are decimated at a predetermined interval, the information of the decimated pixels is lost. Thus, it is concerned that the image after up-conversion becomes an image of degraded image quality.

Also, when the operation mode of the A/D conversion process is selected on the basis of the pixel information given in advance, the A/D conversion process is performed to all pixels, and the electric power consumption is roughly leveled at the same value as when processing a pixel signal of an intermediate level, and the effect of reducing the electric power consumption is limited.

Thus, this technology has a purpose of providing an image processing apparatus, an image processing method, and an image capturing apparatus that can prevent the degradation of the image quality and reduce the electric power consumption.

Solution to Problem

A first aspect of this technology is an image processing apparatus including: an interpolation processing unit that performs an interpolation process of a decimated pixel in an image signal; a signal generation pixel determination unit that calculates a feature value of a pixel of interest from the image signal to which the interpolation process is performed by the interpolation processing unit, and determines whether the pixel of interest is a decimated pixel or a non-decimated pixel on the basis of the calculated feature value, and generates signal generation pixel determination information indicating a determination result; and a signal generation control unit that performs control to stop signal generation operation of the pixel that is determined to be the decimated pixel by the signal generation pixel determination information generated by the signal generation pixel determination unit, at a time of subsequent generation of an image signal.

In this technology, an interpolation processing unit performs an interpolation process of a decimated pixel in an image signal. A signal generation pixel determination unit calculates a flatness of the region of a pixel of interest, for example a dynamic range of a signal within a predetermined area with respect to the pixel of interest, a sum of absolute differences between the pixel of interest and adjacent pixels, or the like, as a feature value of the pixel of interest, from the image signal to which the interpolation process is performed by the interpolation processing unit. Also, the signal generation pixel determination unit compares the calculated feature value of the pixel of interest and a threshold value set by a determination criterion setting unit, and generates signal generation pixel determination information indicating whether the pixel of interest is a decimated pixel or a non-decimated pixel on the basis of the comparison result. A signal generation control unit controls and stops signal generation operation of the pixel that is determined to be the decimated pixel by the signal generation pixel determination information generated by the signal generation pixel determination unit, at the time of subsequent generation of the image signal. For example, an A/D conversion unit, which performs an analog/digital conversion process of an image signal from an image sensor for generating an image signal based on the imaging object optical image, is controlled to stop the analog/digital conversion process to the pixel that is determined to be the decimated pixel. Also, an image sensor drive unit for driving the image sensor is controlled to stop the generation of the signal for the pixel that is determined to be the decimated pixel. Further, when the image size differs between the image signal used in the generation of the signal generation pixel determination information and the image signal generated subsequently, a scaler unit sets the signal generation pixel determination information to signal generation pixel determination information corresponding to the image size of the image signal generated subsequently. Also, the determination criterion setting unit sets a threshold value in accordance with the pixel position of the pixel of interest.

A second aspect of this technology is an image processing method including: performing, by an interpolation processing unit, an interpolation process of a decimated pixel in an image signal; calculating, by a signal generation pixel determination unit, a feature value of a pixel of interest from the image signal after the interpolation process, and determining whether the pixel of interest is a decimated pixel or a non-decimated pixel on the basis of the calculated feature value, and generating signal generation pixel determination information indicating a determination result; and performing control, by a signal generation control unit, to stop signal generation operation of the pixel that is determined to be the decimated pixel by the signal generation pixel determination information generated by the signal generation pixel determination unit, at a time of subsequent generation of an image signal.

A third aspect of this technology is an image capturing apparatus including: an image sensor that generates an image signal based on an imaging object optical image; an interpolation processing unit that performs an interpolation process of the image signal generated by the image sensor; a signal generation pixel determination unit that calculates a feature value of a pixel of interest from the image signal to which the interpolation process is performed by the interpolation processing unit, and determines whether the pixel of interest is a decimated pixel or a non-decimated pixel on the basis of the calculated feature value, and generates signal generation pixel determination information indicating a determination result; and a signal generation control unit that performs control to stop signal generation operation of the pixel that is determined to be the decimated pixel by the signal generation pixel determination information generated by the signal generation pixel determination unit, at a time of subsequent generation of an image signal.

In this technology, the interpolation processing unit performs the interpolation process of the image signal that is generated by the image sensor on the basis of the imaging object optical image, and the signal generation pixel determination unit calculates the feature value of the pixel of interest from the image signal to which the interpolation process is performed by the interpolation processing unit, and generates the signal generation pixel determination information by determining whether the pixel of interest is the decimated pixel or the non-decimated pixel, on the basis of the comparison result between the calculated feature value and the threshold value that is set by the determination criterion setting unit in accordance with an image capturing operating state, for example. The signal generation control unit stops the signal generation operation of the pixel that is determined to be the decimated pixel by the signal generation pixel determination information generated by the signal generation pixel determination unit, at the time of subsequent generation of the image signal. For example, the operation control unit displays a preview image before capturing a still image, and the determination criterion setting unit changes the threshold value, depending on still image capturing or preview image displaying. Further, the operation control unit performs camera shake correction operation, and the determination criterion setting unit changes the threshold value, depending on performing or not performing the camera shake correction operation. Further, the operation control unit performs imaging object detection operation, and the determination criterion setting unit sets the threshold value in accordance with an imaging object detection result in the operation control unit. Further, the determination criterion setting unit sets the threshold value to reduce pixels for which signal generation is performed, in a case of determining that an imaging object is not a predetermined imaging object or in a case of determining that a motion of the imaging object is faster than a predetermined speed, on the basis of the imaging object detection result. Furthermore, the determination criterion setting unit sets the threshold value in accordance with an imaging mode or a brightness of an imaging object. Further, the determination criterion setting unit sets the threshold value in accordance with an output mode of the image signal to which the interpolation process is performed by the interpolation processing unit. Further, a clock unit that acquires time information is included, and the determination criterion setting unit sets the threshold value in accordance with an image capturing time. Also, an electric power consumption estimation unit that estimates an electric power consumption by using the signal generation pixel determination information generated by the signal generation pixel determination unit is further included, and the determination criterion setting unit sets the threshold value in accordance with a comparison result between a designated electric power consumption and the estimated electric power consumption estimated by the electric power consumption estimation unit. Also, a remaining power detection unit that detects a remaining power of a battery for operating the image capturing apparatus is further included, and the determination criterion setting unit sets the threshold value in accordance with a detection result of the remaining power. Furthermore, an electric power consumption estimation unit that estimates an electric power consumption by using the signal generation pixel determination information generated by the signal generation pixel determination unit is further included, and the determination criterion setting unit sets the threshold value to enable imaging operation until an imaging end, on the basis of time until the imaging end, the remaining power detection result of the remaining power detection unit, and an estimation result of the electric power consumption estimation unit.

Advantageous Effects of Invention

According to this technology, the interpolation process of the decimated pixel in the image signal is performed, and the feature value of the pixel of interest is calculated from the image signal to which the interpolation process is performed, and whether the pixel of interest is the decimated pixel or the non-decimated pixel is determined on the basis of the calculated feature value, in order to generate the signal generation pixel determination information indicating the determination result. The control is performed so as not to generate the signal of the pixel that is determined to be the decimated pixel by the signal generation pixel determination information, at the time of the subsequent generation of the image signal. Hence, the degradation of the image quality is prevented, and the electric power consumption is reduced. Note that the effects described in the present specification are just examples and are not limitative, and there may be additional effects.

BRIEF DESCRIPTION OF DRAWINGS

FIG. 3 is a diagram illustrating a partial region of a color filter.

FIG. 5 is a diagram for describing calculation operation of a dynamic range.

FIGS. 10(a), 10(b) and 10(c) are diagrams illustrating a scaling process.

MODE(S) FOR CARRYING OUT THE INVENTION

In the following, a mode for carrying out the present technology will be described. Note that description will be made in the following order.
1. First Embodiment
2. Second Embodiment
3. Another Embodiment

1. First Embodiment

Figure 1:
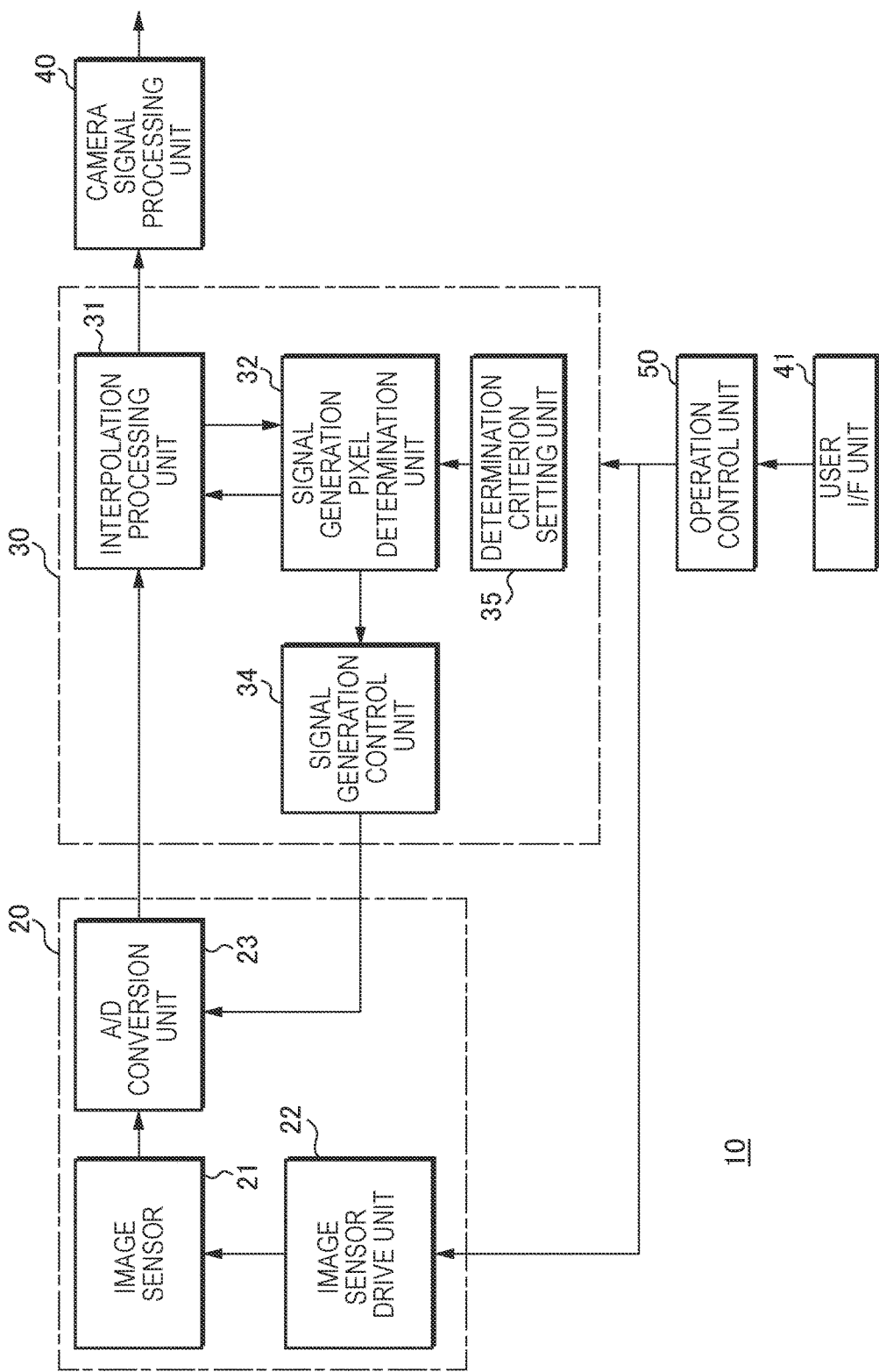
FIG. 1 is a diagram illustrating a configuration of a first embodiment.

FIG. 1 illustrates a configuration of a first embodiment of an image processing apparatus and an image capturing apparatus of this technology. The image capturing apparatus 10 of this technology includes an imaging unit 20, an image processing unit 30, a camera signal processing unit 40, a user interface (I/F) unit 41, and an operation control unit 50, and the image processing apparatus of this technology corresponds to the image processing unit 30.

The imaging unit 20 includes an image sensor 21, an image sensor drive unit 22, and an A/D conversion unit 23, and the image processing unit 30 includes an interpolation processing unit 31, a signal generation pixel determination unit 32, a signal generation control unit 34, and a determination criterion setting unit 35.

The image sensor 21 is configured by using a complementary metal oxide semiconductor (CMOS) image sensor or a charge coupled device (CCD) image sensor, for example. The image sensor 21 generates an image signal based on an imaging object optical image by photoelectric conversion, and outputs the image signal to the A/D conversion unit 23.

The image sensor drive unit 22 generates a driving signal on the basis of a control signal from the operation control unit 50. The image sensor drive unit 22 supplies the generated driving signal to the image sensor 21 and causes the image sensor 21 to generate an image signal.

The A/D conversion unit 23 performs an A/D conversion process to convert the analog image signal supplied from the image sensor 21 to a digital image signal, and outputs the digital image signal to the image processing unit 30. Also, the A/D conversion unit 23 performs the A/D conversion process of a non-decimated pixel on the basis of a pixel control signal supplied from the image processing unit 30. Thus, the image signal output from the A/D conversion unit 23 to the image processing unit 30 becomes a signal to which decimation of pixels is performed in accordance with the pixel control signal. Here, the non-decimated pixel is a pixel that generates the image signal, and the decimated pixel is a pixel that does not generates the image signal.

The interpolation processing unit 31 of the image processing unit 30 performs an interpolation process with regard to the decimated pixel, and generates a pixel signal. The interpolation processing unit 31 generates the pixel signal, by using a method such as linear interpolation (bilinear filter), with regard to the decimated pixel that is determined not to generate the pixel signal, on the basis of the signal generation pixel determination information supplied from the signal generation pixel determination unit 32 described later.

Figure 2A:
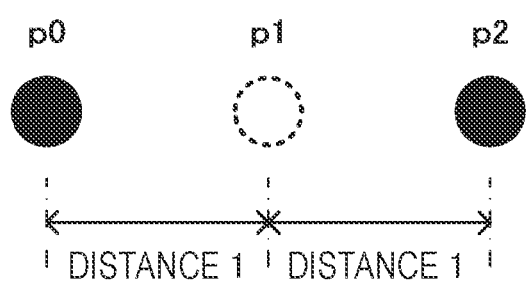
FIGS. 2(a) and 2(b) are diagrams for describing interpolation processing operation in the case of a single plate monochromatic sensor.
Figure 2B:
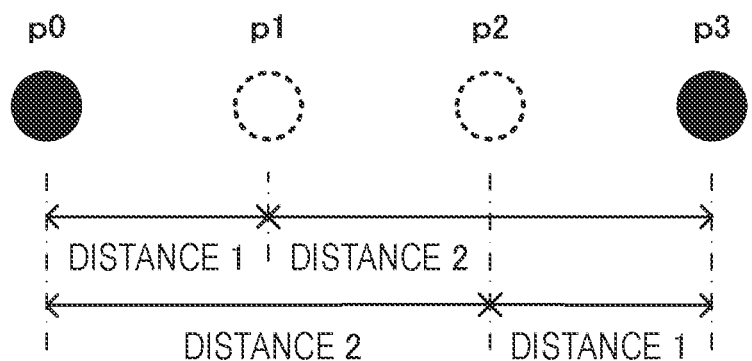

FIGS. 2(a) and 2(b) are diagrams for describing interpolation processing operation when the image sensor 21 is a single plate monochromatic sensor. For example, FIG. 2(a) illustrates a case in which one pixel is decimated. Note that, in the diagram, the decimated pixel is illustrated with a circle mark of a dashed line.

The interpolation processing unit 31 generates a pixel signal p1 of a decimated pixel on the basis of equation (1) by using pixel signals p0, p2 of non-decimated pixels.

$$p1=(p0+p2)/2 \quad (1)$$

Also, when two decimated pixels are consecutive as illustrated in FIG. 2(b), the pixel signals p1, p2 of the decimated pixels are generated from the pixel signals p0, p3 of the non-decimated pixels. Also, in the generation of the pixel signal of the decimated pixel, the pixel signal is generated by performing weighting in accordance with the distance from the non-decimated pixel to the decimated pixel. For example, the pixel signal p1 of the decimated pixel is generated on the basis of equation (2) by using the pixel signals p0, p3 of the non-decimated pixels. Also, the pixel signal p2 of the decimated pixel is generated on the basis of equation (3) by using the pixel signals p0, p3 of the non-decimated pixels.

$$p1=(2p0+p3)/3 \quad (2)$$

$$p2=(p0+2p3)/3 \quad (3)$$

Also, when three or more decimated pixels are consecutive, the pixel signal may be generated by performing the weighting in accordance with the distance from the non-decimated pixel to the decimated pixel, in a similar way to when two pixels are consecutive. Also, the signal generation pixel determination unit 32 determines the pixels of side end portions to be the non-decimated pixels, in order to perform the interpolation process even when the decimation is performed.

Next, the interpolation processing operation when the image sensor 21 is a single plate color sensor will be described. FIG. 3 illustrates a partial region of the color filter used in the image sensor 21. The color filter uses red pixels R, green pixels and blue pixels B, to make the color array a Bayer array.

Figure 4:
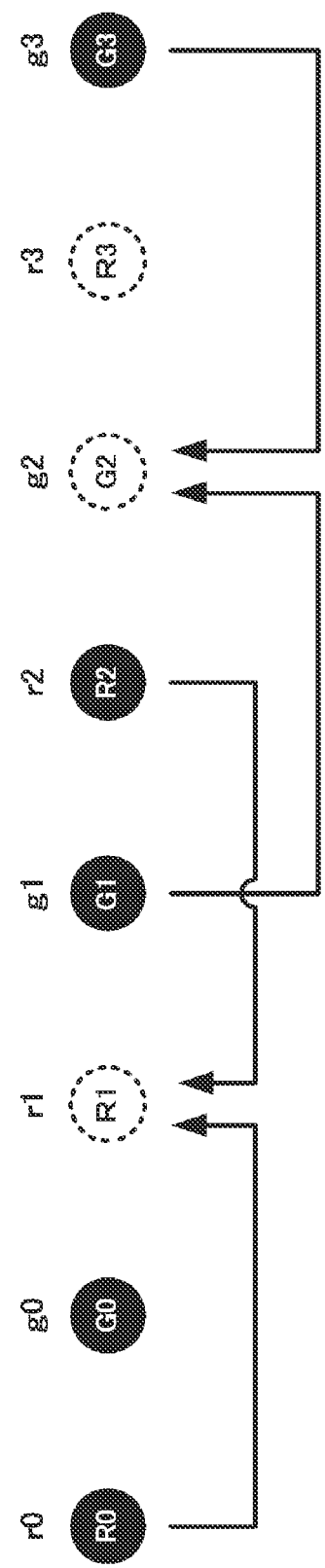
FIG. 4 is a diagram for describing interpolation processing operation when a color array is a Bayer array.

When the single plate color sensor is used, the interpolation processing unit 31 performs the interpolation process for each color component. FIG. 4 is a diagram for describing the interpolation processing operation when the color array is the Bayer array. Note that FIG. 4 illustrates a case in which the red pixels R1, R3 and the green pixel G2 is the decimated pixels.

When performing the interpolation process of the red pixel R1, the interpolation processing unit 31 performs similar computation to the equation (1) by using the pixel signals r0, r2 of the non-decimated pixels, and generates the pixel signal r1. Also, when performing the interpolation process of the green pixel G2, the interpolation processing unit 31 performs the similar computation to the equation (1) by using the pixel signals g1, g3 of the non-decimated pixels G1, G2, and generates the pixel signal g2. Also, the signal generation pixel determination unit 32 determines the pixels of the side end portions of each color to be the non-decimated pixels, in order to enable the interpolation process even when the decimation is performed. Also, when the color array is the Bayer array, green pixel G information can be utilized to interpolate the red pixel R for example, assuming that the proportion of the color signal is constant locally. In this case, the interpolation process can be performed more accurately as compared with linear interpolation that uses the pixels of the same color for each color. Further, the color filter is not limited to a primary color filter but may be a complementary color filter, and the color array is not limited to the Bayer array but may be other color arrangement.

Also, the interpolation processing unit 31 is not limited to the interpolation process that uses the bilinear filter, but may perform the interpolation process by using another filter, for example one-dimensional filter such as bi-cubic filter, Lanczos filter, and Wiener filter. Also, the interpolation processing unit 31 is not limited to the case that uses the left and right pixels as described above, but may perform the interpolation process with a two-dimensional filter that uses the pixels in the vertical direction and the pixels in the oblique direction.

Further, the interpolation processing unit 31 may perform an adaptive filter interpolation process that uses machine learning. In this case, the interpolation processing unit 31 can also perform a learning and adaptation process by using the feature of the image calculated by another process for example.

The signal generation pixel determination unit 32 calculates a feature value from the image signal after the interpolation process, and determines whether the pixel of interest is the decimated pixel or the non-decimated pixel on the basis of the feature value. When the interpolation processing unit 31 performs the interpolation process, the image has a small signal difference between the pixels in a flat region, and the pixel signal generated by using the pixel signals of the surrounding pixels in the interpolation of the decimated pixel has a small difference from the real pixel signal. That is, it is envisaged that the flat portion of the image has a small influence on the image quality by the interpolation process. Thus, the signal generation pixel determination unit 32 uses the information indicating the flatness of the region of the pixel of interest as the feature value, and determines whether the pixel of interest is the decimated pixel or the non-decimated pixel on the basis of this feature value. The flatness in this technology is the information indicating signal variation of the region of the pixel of interest and a change amount when the signal increases or decreases continuously in the region, and the signal generation pixel determination unit 32 calculates the dynamic range in a predetermined area with respect to the position of the pixel of interest for example, as the feature value.

FIG. 5 is a diagram for describing calculation operation of the dynamic range. The signal generation pixel determination unit 32 sets, to the dynamic range, the difference between the maximum value and the minimum value of the pixels in a predetermined area centered at the pixel of interest. When the single plate color sensor is used, the signal generation pixel determination unit 32 sets, to the dynamic range, the difference between the maximum value and the minimum value of the pixels (the pixels illustrated in the frames of the thick lines) in a 3×3 pixel area of the same color as the pixel of interest, with respect to the pixel of interest (the pixel illustrated in the frame of the double line) that is the red pixel R for example, as illustrated in FIG. 5. Note that, when the single plate monochromatic sensor is used, the difference between the maximum value and the minimum value in the pixel of interest and the adjacent 3×3 pixel area is set to the dynamic range with respect to the pixel of interest. Also, a predetermined area centered at the pixel of interest is not limited to the 3×3 pixels but may be a wider region, and the shape of the region is not limited to a rectangle but may be another shape such as a cross for example.

Also, the feature value is not limited to the above dynamic range if the feature value is information indicating the flatness of the region of the pixel of interest. The signal generation pixel determination unit 32 may use a first differentiation feature value, for example a sum of the difference absolute value (sum of absolute differences) between the pixel of interest and each adjacent pixel which is the feature value according to the signal variation between the pixels, a feature value based on the frequency component, for example. The signal generation pixel determination unit 32 is not limited to a case in which one feature value is used, but there is a method in which a plurality of feature values are utilized in combination, and whether the difference from the real value is large or small in the interpolation process is guessed from these feature values.

Next, the signal generation pixel determination unit 32 determines whether the pixel of interest is the decimated pixel or the non-decimated pixel on the basis of the feature value. The signal generation pixel determination unit 32 compares the feature value calculated from the image signal after the interpolation process with a threshold value, and determines the pixel of interest to be the decimated pixel if the region of the pixel of interest is flat and the feature value is the threshold value or less. Also, the signal generation pixel determination unit 32 determines the pixel of interest to be the non-decimated pixel if the region of the pixel of interest is not flat and the feature value is larger than the threshold value. The signal generation pixel determination unit 32 stores the determination result indicating one of the decimated pixel and the non-decimated pixel as the signal generation pixel determination information. The signal generation pixel determination unit 32 outputs the signal generation pixel determination information indicating the determination result of all pixels of one screen image to the signal generation control unit 34, when the determination is completed with regard to all the pixels of the one screen image.

Also, the signal generation pixel determination unit 32 outputs the stored signal generation pixel determination information to the interpolation processing unit 31 and the signal generation control unit 34, in order to enable the stored signal generation pixel determination information to be used in the generation of the next image signal. For example, in the case of the moving image capturing, the signal generation pixel determination unit 32 outputs the signal generation pixel determination information to the interpolation processing unit 31 and the signal generation control unit 34, in order to perform the process and the control operation by using the signal generation pixel determination information in the generation of the next image signal, after a sampling rate time elapses (for example, after a frame period elapses). Also, in the case of still image capturing, the digital camera, the smartphone, or the like of recent years displays a preview image before image capturing, or generates an image signal by driving the imaging unit 20 for autofocus, in some cases. In this situation, the signal generation pixel determination information is generated from the image signal immediately before the still image capturing, and this signal generation pixel determination information is output to the interpolation processing unit 31 and the signal generation control unit 34 in order to be used in the generation of the image signal of the still image.

The signal generation control unit 34 stops the A/D conversion process to the decimated pixel, by generating a pixel control signal on the basis of the signal generation pixel determination information supplied from the signal generation pixel determination unit 32 and outputting the pixel control signal to the A/D conversion unit 23. Thus, the image signal output from the A/D conversion unit 23 to the image processing unit 30 is a signal to which the decimation of the pixel is performed on the basis of the signal generation pixel determination information. Also, as described above, the signal generation pixel determination information is output to the interpolation processing unit 31, and the interpolation processing unit 31 performs the interpolation process to the decimated pixel for which the A/D conversion process is stopped.

The determination criterion setting unit 35 sets a threshold value that is used at the time of the generation of the signal generation pixel determination information by means of the signal generation pixel determination unit 32, and outputs the threshold value to the signal generation pixel determination unit 32. The threshold value may be a predetermined value and may be changeable. Also, the threshold value may be set for each screen image for example, and may be set for each pixel or for each pixel region composed of a plurality of adjacent pixels, as in another embodiment described later.

The camera signal processing unit 40 performs camera signal processing, such as a demosaic process, a process for optimizing brightness, contrast, and color reproduction for example, to the image signal output from the interpolation processing unit 31. The user interface unit 41 generates the operation signal in accordance with the user operation, and outputs the operation signal to the operation control unit 50.

The operation control unit 50 controls each unit on the basis of the operation signal from the user interface unit 41, and controls each unit in such a manner that the image capturing apparatus operates in accordance with the user operation.

Figure 6:
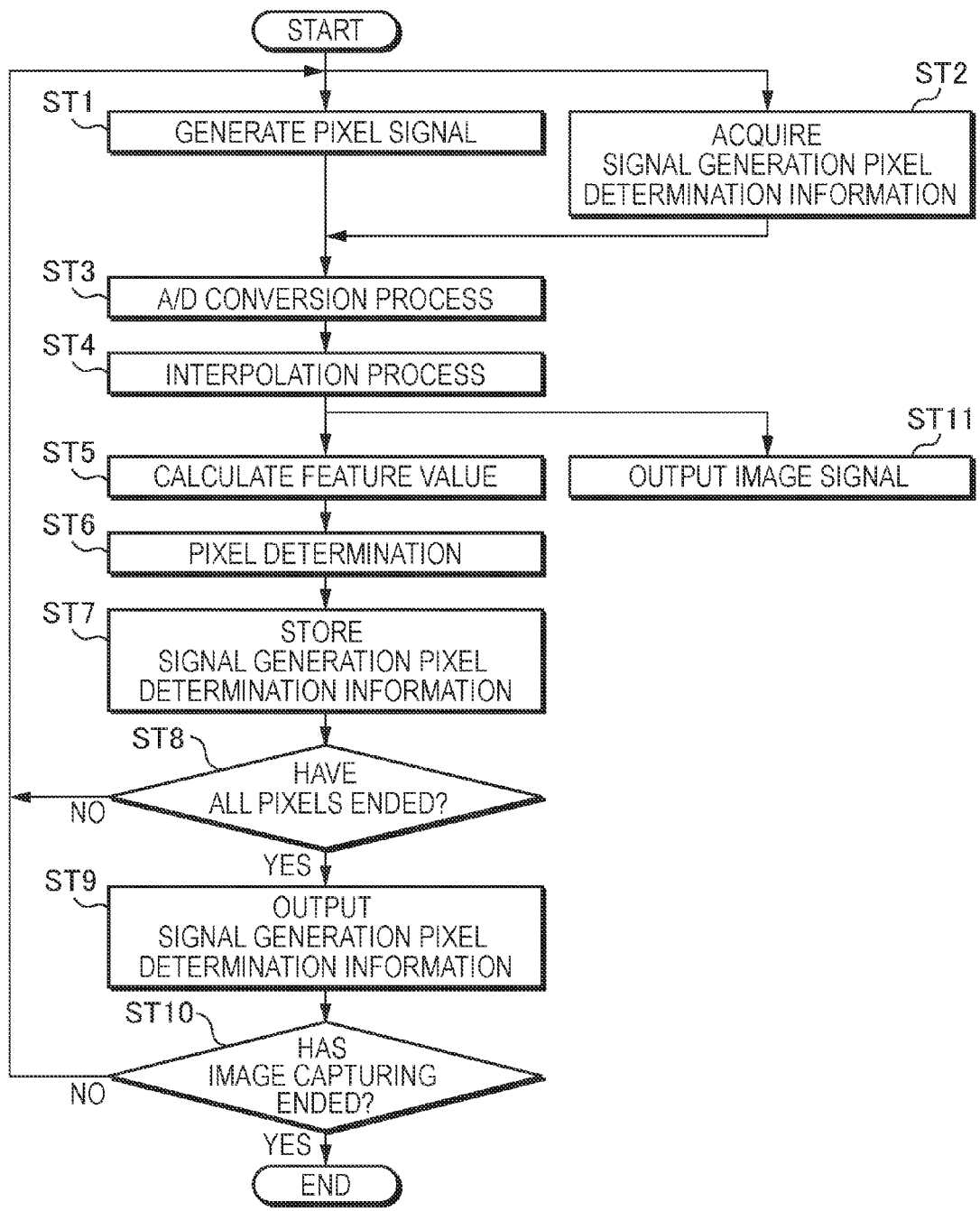
FIG. 6 is a flowchart illustrating operation of the first embodiment.

FIG. 6 is a flowchart illustrating the operation of the first embodiment. In step ST1, the image sensor 21 generates a pixel signal and proceeds to step ST3.

In step ST2, the signal generation control unit 34 acquires the signal generation pixel determination information. The signal generation control unit 34 acquires the signal generation pixel determination information supplied from the signal generation pixel determination unit 32, and generates a pixel control signal on the basis of the signal generation pixel determination information, and proceeds to step ST3.

In step ST3, the A/D conversion unit 23 performs the A/D conversion process. On the basis of the pixel control signal supplied from the signal generation control unit 34, the A/D conversion unit 23 stops the A/D conversion process if the pixel for which the pixel signal is generated in step ST1 is the decimated pixel, and performs the A/D conversion process if the pixel for which the pixel signal is generated in step ST1 is the non-decimated pixel, and proceeds to step ST4.

In step ST4, the interpolation processing unit 31 performs the interpolation process. The interpolation processing unit 31 acquires the signal generation pixel determination information supplied from the signal generation pixel determination unit 32. Also, the interpolation processing unit 31 performs the interpolation process of the decimated pixel to the image signal after the A/D conversion process on the basis of the acquired signal generation pixel determination information, and proceeds to step ST5.

In step ST5, the signal generation pixel determination unit 32 calculates a feature value. The signal generation pixel determination unit 32 calculates the feature value for each pixel by using the image signal processed by the interpolation processing unit 31, and proceeds to step ST6.

In step ST6, the signal generation pixel determination unit 32 performs pixel determination. The signal generation pixel determination unit 32 compares the feature value calculated in step ST5 with the threshold value set by the determination criterion setting unit 35, and determines the decimated pixel or the non-decimated pixel for each pixel. Also, the signal generation pixel determination unit 32 generates the signal generation pixel determination information indicating the determination result, and proceeds to step ST7.

In step ST7, the signal generation pixel determination unit 32 stores the signal generation pixel determination information. The signal generation pixel determination unit 32 stores the signal generation pixel determination information to enable the signal generation pixel determination information to be used in the generation of the next image signal, and proceeds to step ST8.

In step ST8, the operation control unit 50 determines whether the process of all the pixels has ended. The operation control unit 50 determines whether the process from step ST1 to step ST7 has been completed to all the pixels of the one screen image. The operation control unit 50 returns to step ST1 if the process has not been completed to all the pixels, and performs the process from step ST1 to step ST7 to the next pixel. Also, the operation control unit 50 proceeds to step ST9 if the process has been completed to all the pixels. Note that the end determination of the process of all the pixels is not limited to a case in which the operation control unit 50 performs the end determination, but the process from step ST1 to step ST7 may be automatically performed by each unit until the process is completed to all the pixels of one screen image.

In step ST9, the signal generation pixel determination unit 32 outputs the signal generation pixel determination information. Having determined the decimated pixel or the non-decimated pixel with regard to all the pixels of one screen image, the signal generation pixel determination unit 32 outputs the signal generation pixel determination information indicating the determination result of the one screen image to the interpolation processing unit 31 and the signal generation control unit 34, and proceeds to step ST10. Thus, the interpolation processing unit 31 and the signal generation control unit 34 perform the process by using new signal generation pixel determination information, in the next frame for example.

In step ST10, the operation control unit 50 determines whether the image capturing has ended. The operation control unit 50 returns to step ST1 if the operation control unit 50 does not determine that the image capturing of the moving image or the still image has ended, and ends the operation if the user operation for ending image capturing, for example the image capturing of the moving image or the still image, is performed.

Note that the camera signal processing unit 40 outputs the image signal in step ST11. The camera signal processing unit 40 performs various signal processing to the image signal supplied from the interpolation processing unit 31 and outputs the image signal.

According to this first embodiment, the decimated pixel is provided in the flat image region, and the A/D conversion process is stopped at the decimated pixel, and thereby both of the generation of the captured image of preferable image quality and the reduction of the electric power consumption of the image capturing apparatus can be achieved. Also, the signal generation pixel determination information is sequentially updated, and therefore the signal generation pixel determination information is generated in accordance with the change of the imaging object, and the degradation of the image quality is prevented, and the electric power consumption of the image capturing apparatus is reduced.

2. Second Embodiment

Next, a second embodiment will be described. In the above first embodiment, the configuration that prevents the degradation of the image quality and reduces the electric power consumption of the image capturing apparatus by designating the threshold value has been described, but in the second embodiment, a case in which the image capturing apparatus is controlled to consume a designated electric power will be described.

Figure 7:
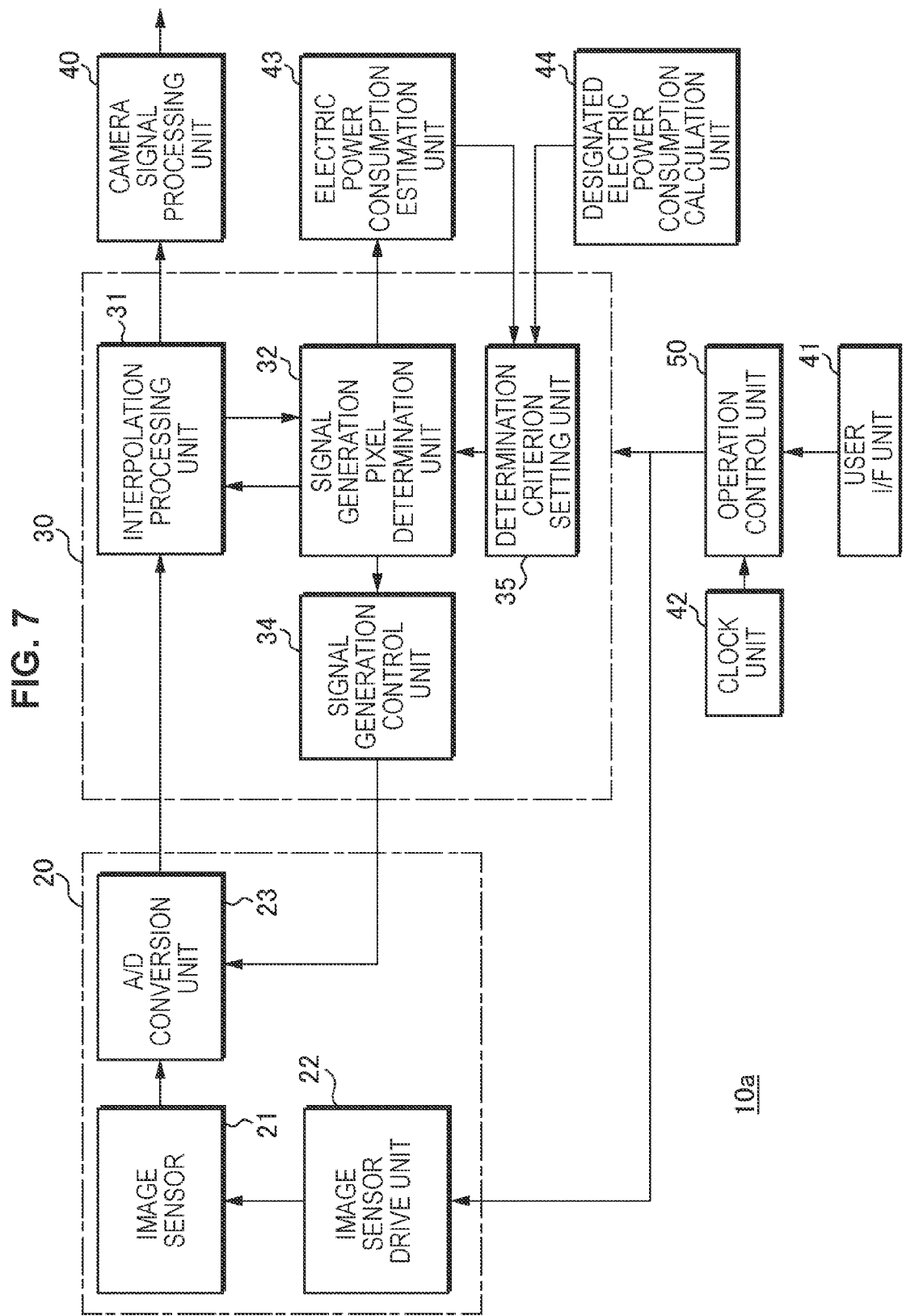
FIG. 7 is a diagram illustrating a configuration of a second embodiment.

FIG. 7 illustrates a configuration of the second embodiment of the image capturing apparatus that uses the image processing apparatus of this technology. Note that, in FIG. 7, the same reference signs are laid for the blocks that correspond to the first embodiment.

An image capturing apparatus 10a includes an imaging unit 20, an image processing unit 30, a camera signal processing unit 40, a user interface (I/F) unit 41, a clock unit 42, an electric power consumption estimation unit 43, a designated electric power consumption calculation unit 44, and an operation control unit 50.

The imaging unit 20 includes an image sensor 21, an image sensor drive unit 22, and an A/D conversion unit 23, and the image processing unit 30 includes an interpolation processing unit 31, a signal generation pixel determination unit 32, a signal generation control unit 34, and a determination criterion setting unit 35.

The image sensor 21 generates an image signal based on an imaging object optical image by photoelectric conversion, and outputs the image signal to the A/D conversion unit 23.

The image sensor drive unit 22 generates a driving signal on the basis of the control signal from the operation control unit 50. The image sensor drive unit 22 supplies the generated driving signal to the image sensor 21 and causes the image sensor 21 to generate an image signal.

The A/D conversion unit 23 performs an A/D conversion process to convert the analog image signal supplied from the image sensor 21 to a digital image signal, and outputs the digital image signal to the image processing unit 30. Also, the A/D conversion unit 23 performs the A/D conversion process of the non-decimated pixel on the basis of the pixel control signal supplied from the image processing unit 30, and outputs, to the image processing unit 30, the image signal to which the decimation of the pixel is performed in accordance with the pixel control signal.

The interpolation processing unit 31 of the image processing unit 30 performs the interpolation process with regard to the decimated pixel, and generates the pixel signal. The interpolation processing unit 31 generates the pixel signal by using a method such as a linear interpolation, with regard to the decimated pixel that is determined not to generate the pixel signal, on the basis of the signal generation pixel determination information supplied from the signal generation pixel determination unit 32 described later.

The signal generation pixel determination unit 32 calculates a feature value from the image signal after the interpolation process, and determines whether the pixel of interest is the decimated pixel or the non-decimated pixel on the basis of the feature value. The signal generation pixel determination unit 32 sets the information indicating the flatness of the region of the pixel of interest to the feature value. The signal generation pixel determination unit 32 compares the feature value calculated from the image signal after the interpolation process with a threshold value, and stores the comparison result as the signal generation pixel determination information indicating one of the decimated pixel and the non-decimated pixel. When the determination is completed with regard to all the pixels of one screen image, the signal generation pixel determination unit 32 outputs the signal generation pixel determination information indicating the determination result of all the pixels of the one screen image, to the interpolation processing unit 31 and the signal generation control unit 34, in order to enable the signal generation pixel determination information to be used in the generation of the next image signal.

The signal generation control unit 34 generates the pixel control signal on the basis of the signal generation pixel determination information supplied from the signal generation pixel determination unit 32, and outputs the pixel control signal to the A/D conversion unit 23, and stops the A/D conversion process to the decimated pixel. Thus, the image signal output from the A/D conversion unit 23 to the image processing unit 30 is a signal to which the decimation of the pixel is performed on the basis of the signal generation pixel determination information. Also, as described above, the signal generation pixel determination information is output to the interpolation processing unit 31, and the interpolation processing unit 31 performs the interpolation process to the decimated pixel for which the A/D conversion process is stopped.

The determination criterion setting unit 35 sets the threshold value that uses at the time of the generation of the signal generation pixel determination information by means of the signal generation pixel determination unit 32, and outputs the threshold value to the signal generation pixel determination unit 32. The determination criterion setting unit 35 sets the threshold value in such a manner that the estimated electric power consumption estimated by the electric power consumption estimation unit 43 described later is equal to or smaller than the designated electric power consumption calculated by the designated electric power consumption calculation unit 44 described later.

The camera signal processing unit 40 performs camera signal processing to the image signal output from the interpolation processing unit 31. Also, the user interface unit 41 generates the operation signal in accordance with the user operation, and outputs the operation signal to the operation control unit 50. The clock unit 42 generates time information, and outputs the time information to the operation control unit 50.

The electric power consumption estimation unit 43 estimates the electric power consumption of the image capturing apparatus, on the basis of the signal generation pixel determination information generated by the signal generation pixel determination unit 32. The electric power consumption estimation unit 43 stores, in advance, information indicating a relationship between the number of decimated pixels and the electric power consumption, and outputs the electric power consumption corresponding to the number of decimated pixels indicated by the signal generation pixel determination information as the estimated electric power consumption to the determination criterion setting unit 35. Also, the electric power consumption estimation unit 43 may store, in advance, information indicating a relationship between the number of decimated pixels and the electric power consumption that can be reduced, and estimate the electric power consumption reduced by providing the decimated pixels, and set it as the estimated electric power consumption.

The designated electric power consumption calculation unit 44 calculates what electric power value is the electric power consumption at the time of image capturing, and outputs the calculated electric power consumption as the designated electric power consumption to the determination criterion setting unit 35. For example, when the image capturing apparatus 10a operates with the electric power from a battery, the designated electric power consumption calculation unit 44 calculates the electric power consumption on the basis of the imaging time and the remaining power of the battery in order to capture the image for a desired time, and sets the calculated electric power consumption as the designated electric power consumption. Also, when the electric power consumption estimation unit 43 estimates the electric power consumption reduced as the estimated electric power consumption, the designated electric power consumption calculation unit 44 may calculate a necessary reduction amount of the electric power consumption, and output the calculated electric power reduction amount as the designated electric power consumption to the determination criterion setting unit 35.

The operation control unit 50 controls each unit on the basis of the operation signal from the user interface unit 41, and controls each unit in such a manner that the image capturing apparatus operates in accordance with the user operation. Also, the operation control unit 50 starts or ends the imaging at a desired time, and performs the imaging for a predetermined period, by utilizing the time information supplied from the clock unit 42.

Figure 8:
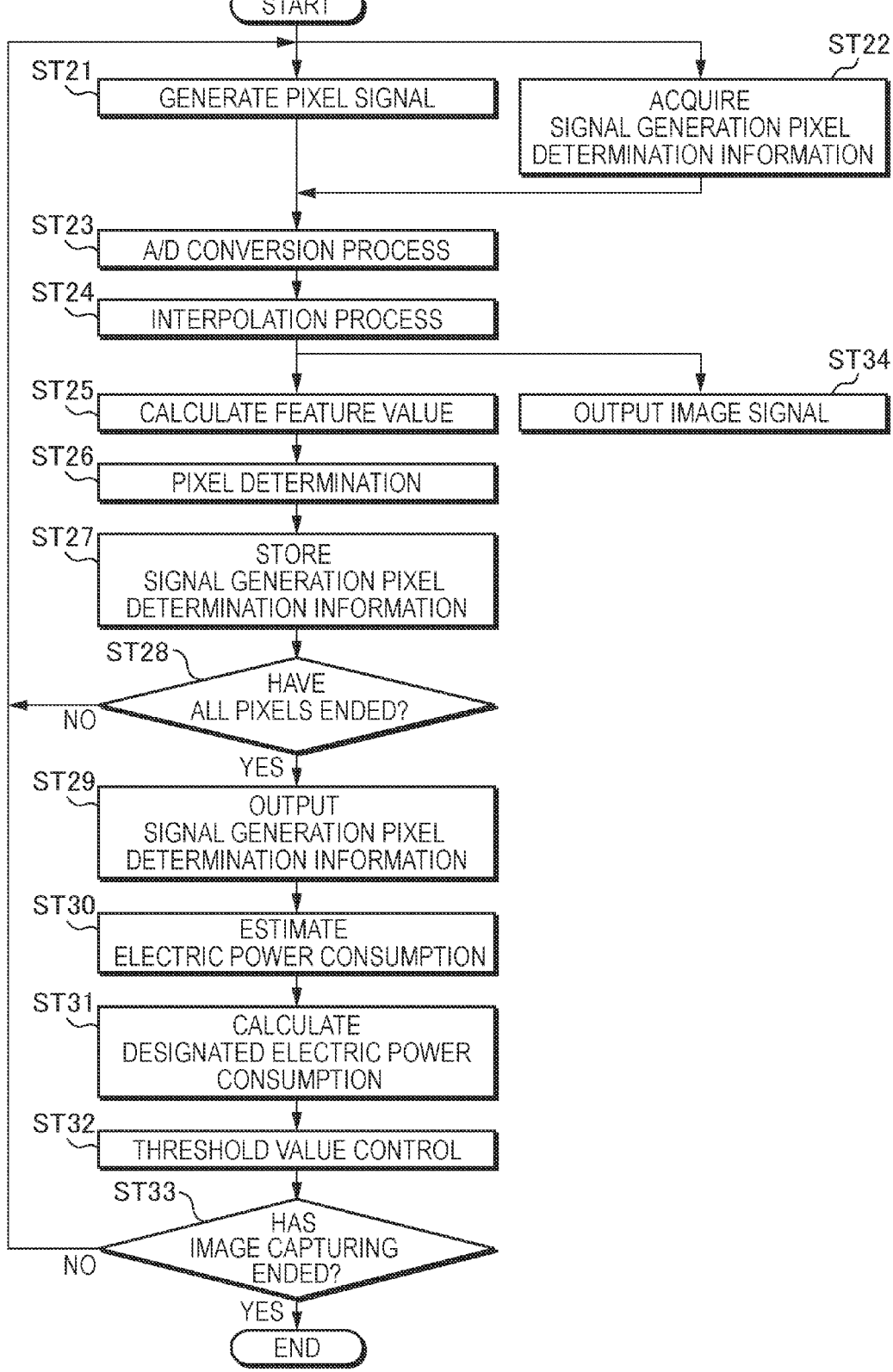
FIG. 8 is a flowchart illustrating operation of the second embodiment.

FIG. 8 is a flowchart illustrating the operation of the second embodiment. In step ST21, the image sensor 21 generates a pixel signal and proceeds to step ST23.

In step ST22, the signal generation control unit 34 acquires the signal generation pixel determination information. The signal generation control unit 34 acquires the signal generation pixel determination information supplied from the signal generation pixel determination unit 32, and generates a pixel control signal on the basis of the signal generation pixel determination information, and proceeds to step ST23.

In step ST23, the A/D conversion unit 23 performs the A/D conversion process. On the basis of the pixel control signal supplied from the signal generation control unit 34, the A/D conversion unit 23 stops the A/D conversion process if the pixel for which the pixel signal is generated in step ST21 is the decimated pixel, and performs the A/D conversion process if the pixel for which the pixel signal is generated in step ST21 is the non-decimated pixel, and proceeds to step ST24.

In step ST24, the interpolation processing unit 31 performs the interpolation process. The interpolation processing unit 31 acquires the signal generation pixel determination information stored in the signal generation pixel determination unit 32. Also, the interpolation processing unit 31 performs the interpolation process of the decimated pixel to the image signal after the A/D conversion process, on the basis of the acquired signal generation pixel determination information, and proceeds to step ST25.

In step ST25, the signal generation pixel determination unit 32 calculates a feature value. The signal generation pixel determination unit 32 calculates the feature value of each pixel by using the image signal processed by the interpolation processing unit 31, and proceeds to step ST26.

In step ST26, the signal generation pixel determination unit 32 performs pixel determination. The signal generation pixel determination unit 32 compares the feature value calculated by step ST25 with the threshold value set by the determination criterion setting unit 35, and determines the decimated pixel or the non-decimated pixel for each pixel. Also, the signal generation pixel determination unit 32 generates the signal generation pixel determination information indicating the determination result, and proceeds to step ST27.

In step ST27, the signal generation pixel determination unit 32 stores the signal generation pixel determination information. The signal generation pixel determination unit 32 stores the signal generation pixel determination information to enable the signal generation pixel determination information to be used in the generation of the next image signal, and proceeds to step ST28.

In step ST28, the operation control unit 50 determines whether the process of all the pixels has ended. The operation control unit 50 determines whether the process from step ST21 to step ST27 has been completed to all the pixels of one screen image. The operation control unit 50 returns to step ST21 if the process has not been completed to all the pixels, and performs the process from step ST21 to step ST27 to the next pixel. Also, the operation control unit 50 proceeds to step ST29 if the process has been completed to all the pixels. Note that the end determination of the process of all the pixels is not limited to a case in which the operation control unit 50 performs the end determination, but the process from step ST21 to step ST27 may be automatically performed by each unit until the process is completed to all the pixels of one screen image.

In step ST29, the signal generation pixel determination unit 32 outputs the signal generation pixel determination information. The signal generation pixel determination unit 32 outputs the signal generation pixel determination information indicating the determination result of the one screen image to the interpolation processing unit 31, the signal generation control unit 34, and the electric power consumption estimation unit 43, and proceeds to step ST30. Thus, the interpolation processing unit 31 and the signal generation control unit 34 perform the process by using new signal generation pixel determination information, in the next frame for example.

In step ST30, the electric power consumption estimation unit 43 estimates the electric power consumption. The electric power consumption estimation unit 43 estimates the electric power consumption on the basis of the signal generation pixel determination information supplied from the signal generation pixel determination unit 32, and proceeds to step ST31.

In step ST31, the designated electric power consumption calculation unit 44 calculates the designated electric power consumption. The designated electric power consumption calculation unit 44 calculates what value is the electric power consumption at the time of image capturing, and set the calculation result as the designated electric power consumption, and proceeds to step ST32.

In step ST32, the determination criterion setting unit 35 controls the threshold value. The determination criterion setting unit 35 controls the threshold value in such a manner that the electric power consumption estimated in step ST30 is equal to or smaller than the designated electric power consumption calculated in step ST31. That is, when the estimated electric power consumption is larger than the designated electric power consumption, the determination criterion setting unit 35 makes the threshold value higher, in such a manner that the decimated pixels increase in number and the electric power consumption becomes smaller. Also, when the estimated electric power consumption is equal to or smaller than the designated electric power consumption, the determination criterion setting unit 35 may maintain the value of the threshold value, and may make the threshold value lower in such a manner that the decimated pixels decreases in number. The determination criterion setting unit 35 controls the threshold value as described above, and proceeds to step ST33.

In step ST33, the operation control unit 50 determines whether the image capturing has ended. The operation control unit 50 returns to step ST21 if the operation control unit 50 does not determine that the image capturing of the moving image or the still image has ended, and ends the operation if the user operation for ending image capturing, for example the image capturing of the moving image or the still image, is performed.

Note that the camera signal processing unit 40 outputs the image signal in step ST34. The camera signal processing unit 40 performs various signal processing to the image signal supplied from the interpolation processing unit 31 and outputs the image signal.

According to this second embodiment, the decimated pixels are provided in the flat image region of the imaging object, and the A/D conversion process is stopped at the decimated pixels, and thus both of the generation of the captured image of preferable image quality and the control of the electric power consumption of the image capturing apparatus can be achieved. Also, the signal generation pixel determination information is sequentially updated, and therefore the signal generation pixel determination information is generated in accordance with the change of the imaging object, and the degradation of the image quality is prevented, and the image capturing apparatus is operated with desired electric power consumption.

3. Another Embodiment

Next, another embodiment will be described. In the other embodiment, a case in which the threshold value and the designated electric power consumption is controlled in accordance with the operation of the image capturing apparatus will be described.

Figure 9:
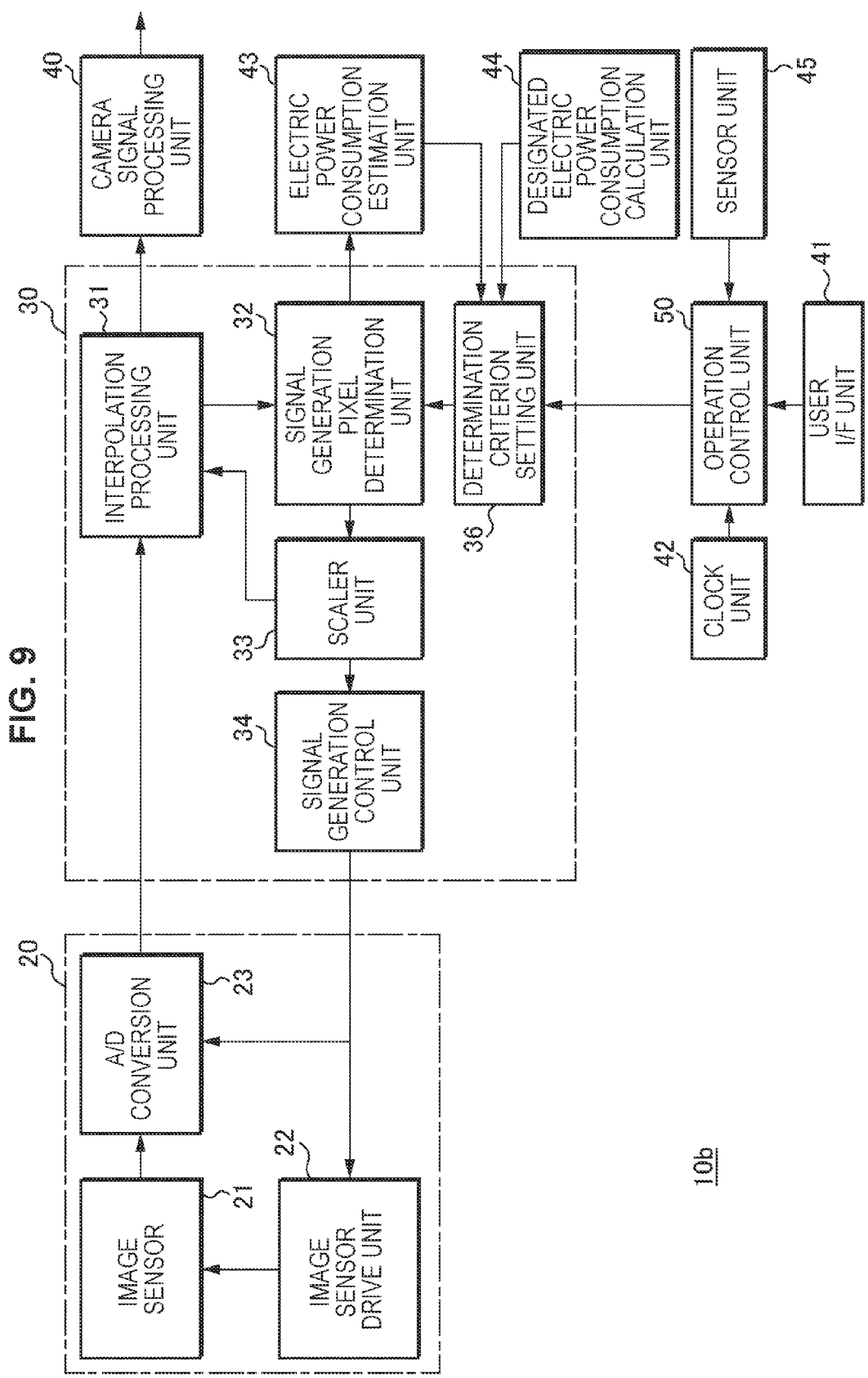
FIG. 9 is a diagram illustrating a configuration of another embodiment.

FIG. 9 illustrates the configuration of the other embodiment of the image capturing apparatus. Note that, in FIG. 9, the same reference signs are laid for the blocks that correspond to the first embodiment and the second embodiment.

An image capturing apparatus 10b includes an imaging unit 20, an image processing unit 30, a camera signal processing unit 40, a user interface unit (user I/F unit) 41, a clock unit 42, an electric power consumption estimation unit 43, a designated electric power consumption calculation unit 44, a sensor unit 45, and an operation control unit 50.

The imaging unit 20 includes an image sensor 21, an image sensor drive unit 22, and an A/D conversion unit 23, and the image processing unit 30 includes an interpolation processing unit 31, a signal generation pixel determination unit 32, a signal generation control unit 34, and a determination criterion setting unit 36.

The image sensor 21 generates an image signal based on an imaging object optical image by photoelectric conversion, and outputs the image signal to the A/D conversion unit 23.

The image sensor drive unit 22 generates a driving signal on the basis of the control signal from the operation control unit 50. The image sensor drive unit 22 supplies the generated driving signal to the image sensor 21 and causes the image sensor 21 to generate an image signal.

The A/D conversion unit 23 performs an A/D conversion process to convert the analog image signal supplied from the image sensor 21 to a digital image signal, and outputs the digital image signal to the image processing unit 30. Also, the A/D conversion unit 23 performs the A/D conversion process of the non-decimated pixel designated by the pixel control signal supplied from the image processing unit 30, and outputs, to the image processing unit 30, the image signal to which the decimation of the pixel is performed in accordance with the pixel control signal.

The interpolation processing unit 31 of the image processing unit 30 performs the interpolation process with regard to the decimated pixel. The interpolation processing unit 31 performs the interpolation process such as the linear interpolation with regard to the decimated pixel, on the basis of the signal generation pixel determination information supplied from a scaler unit 33 described later.

The signal generation pixel determination unit 32 calculates a feature value from the image signal after the interpolation process, and determines whether the pixel of interest is the decimated pixel or the non-decimated pixel on the basis of the feature value. The signal generation pixel determination unit 32 sets the information indicating the flatness of the region of the pixel of interest to the feature value. The signal generation pixel determination unit 32 compares the feature value calculated from the image signal after the interpolation process with a threshold value, and stores the comparison result as the signal generation pixel determination information indicating one of the decimated pixel and the non-decimated pixel. When the determination has been completed with regard to all the pixels of the one screen image, the signal generation pixel determination unit 32 outputs the signal generation pixel determination information indicating the determination result of all the pixels of the one screen image to the scaler unit 33.

When the image size differs between the image signal used in the generation of the signal generation pixel determination information and the image signal generated subsequently, the scaler unit 33 performs a scaling process to the signal generation pixel determination information. The scaler unit 33 converts the signal generation pixel determination information supplied from the signal generation pixel determination unit 32 to the signal generation pixel determination information corresponding to the image size of the image signal generated subsequently, by the scaling process, and outputs the signal generation pixel determination information to the interpolation processing unit 31 and the signal generation control unit 34.

Figures 10A, 10B, 10C:
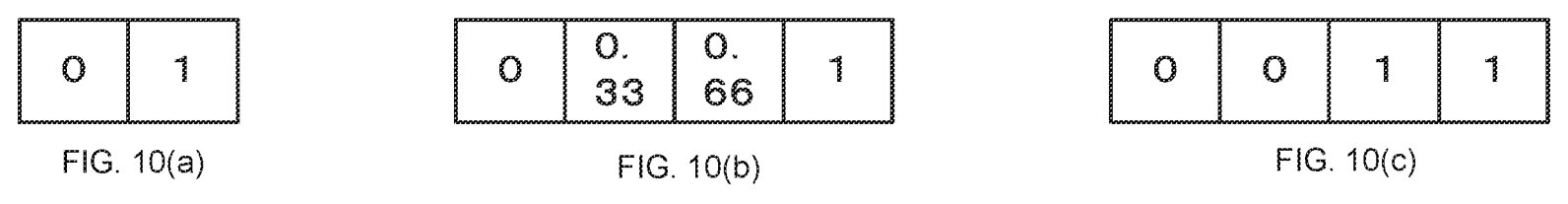

FIGS. 10(a), 10(b) and 10(c) illustrate the scaling process. FIG. 10(a) illustrates the signal generation pixel determination information before the scaling, in which the determination value of the decimated pixel for which the pixel signal is not generated is set to "1", and the determination value of the pixel for which the pixel signal is generated is set to "0". Here, when the signal generation pixel determination information of two pixels is newly generated between the pixels, the interpolation values of the two pixels for which the signal generation pixel determination information is newly generated are calculated by the interpolation process that uses the bilinear filter, as illustrated in FIG. 10(*b*) for example. Further, the interpolation values "0.33" and "0.66" are compared with a predetermined threshold value (for example "0.5"), and as illustrated in FIG. 10(*c*), the determination value is set to "0" with regard to the pixel at which the interpolation value is equal to or smaller than the threshold value, and the determination value is set to "1" with regard to the pixel at which the interpolation value is larger than the threshold value. In this way, the scaler unit 33 performs the scaling process. Also, when the image generated by the imaging unit is the image of the color array such as the Bayer array, the scaling process is performed for each color. Note that a logical OR method, a nearest neighbor method, a nine division method, a projection method, a distance inverse proportion method, or the like may be utilized in the scaling process.

The signal generation control unit 34 generates the pixel control signal on the basis of the signal generation pixel determination information supplied from the scaler unit 33, and outputs the pixel control signal to the A/D conversion unit 23, and stops the A/D conversion process to the decimated pixel. Thus, the image signal output from the A/D conversion unit 23 to the image processing unit 30 is a signal to which the decimation of the pixel is performed on the basis of the signal generation pixel determination information. Also, as described above, the signal generation pixel determination information is output to the interpolation processing unit 31, and the interpolation processing unit 31 performs the interpolation process to the pixel for which the A/D conversion process is stopped.

The determination criterion setting unit 36 sets the threshold value that is used at the time of the generation of the signal generation pixel determination information, and outputs the threshold value to the signal generation pixel determination unit 32. Also, the determination criterion setting unit 36 sets the threshold value in accordance with the operation of the image capturing apparatus 10*b*. For example, the determination criterion setting unit 36 sets the threshold value on the basis of the operation information generated by the operation control unit 50 in accordance with the image capturing operating state of the image capturing apparatus 10*b*. Further, the determination criterion setting unit 36 may set the threshold value on the basis of the estimated electric power consumption estimated by the electric power consumption estimation unit 43 and the electric power consumption designated by the designated electric power consumption calculation unit 44.

The camera signal processing unit 40 performs camera signal processing to the image signal output from the interpolation processing unit 31. Also, the user interface unit 41 generates the operation signal in accordance with the user operation, and outputs the operation signal to the operation control unit 50. The clock unit 42 generates time information, and outputs the time information to the operation control unit 50.

The electric power consumption estimation unit 43 estimates the electric power consumption of the image capturing apparatus on the basis of the signal generation pixel determination information generated by the signal generation pixel determination unit 32, and outputs the estimated electric power consumption to the determination criterion setting unit 36.

The designated electric power consumption calculation unit 44 calculates what value is the electric power consumption at the time of image capturing, and outputs the calculated electric power consumption as the designated electric power consumption value to the determination criterion setting unit 36.

The sensor unit 45 is configured by using an acceleration sensor, a tilt sensor, or the like for example, and detects movement, orientation change, or the like of the image capturing apparatus. Also, the sensor unit 45 is provided with an exposure sensor or the like to detect the brightness of the imaging object. The sensor unit 45 outputs a sensor signal indicating the detection result to the operation control unit 50. Note that the movement and the orientation change of the image capturing apparatus and the brightness of the imaging object may be determined from the image signal output from the imaging unit 20. For example, the movement and the orientation change of the image capturing apparatus can be determined by utilizing a motion vector calculated by using a plurality frames of images. Also, the brightness of the imaging object can be determined by utilizing an average value of the signal level of the image signal or the signal level of a part of the image region, a gain value used in gain adjustment of the image signal, or the like.

The operation control unit 50 controls each unit on the basis of the operation signal from the user interface unit 41 and the sensor signal from the sensor unit 45, and performs switching to the operation mode in accordance with the user operation and various types of control operation based on the sensor signal. Also, the operation control unit 50 performs switching of the operation mode by utilizing time information acquired from the clock unit 42. Also, the operation control unit 50 generates the operation information in accordance with the image capturing operating state, for example the operation mode and the control operating state, of the image capturing apparatus 10*b* and outputs the operation information to the determination criterion setting unit 36.

Next, threshold value setting operation in the determination criterion setting unit 36 will be described. The determination criterion setting unit 36 sets the threshold value on the basis of the operation information supplied from the operation control unit 50, as described above.

When the output mode of the image signal output from the camera signal processing unit 40 is indicated by the operation information, the determination criterion setting unit 36 sets the threshold value in accordance with the output mode. For example, when the image signal output from the camera signal processing unit 40 is recorded in a recording medium in a low image quality state by irreversible high compression processing, the threshold value is made higher to set a large number of decimated pixels. Thus, the electric power consumption can be reduced, when the captured image is recorded in low image quality.

Also, when the operation information indicates a preview image display, the determination criterion setting unit 36 is needless to prioritize the image quality unlike still image recording, and thus makes the threshold value higher. Thus, the electric power consumption can be reduced at the time of the preview image display. Note that, in order to facilitate the display of the preview image, when the preview image has a smaller image size than the still image, the image size differs between the image signal used at the time of generation of the signal generation pixel determination information and the image signal generated by utilizing the signal generation pixel determination information. Thus, the scaler unit 33 converts the signal generation pixel determination information corresponding to the image size of the preview image to the signal generation pixel determination information corresponding to the image size of the still image.

Also, when the operation information indicates the operation mode for detecting the imaging object, the scene, or the like, it is assumed that an important imaging object such as a person is captured, and therefore the determination criterion setting unit 36 makes the threshold value lower and prioritizes the image quality of the captured image over the reduction of the electric power consumption.

Also, when the operation information indicates the operation mode for capturing an image of an object that moves at a high speed, it is difficult to capture a high quality image of the object that moves at the high speed, and therefore the determination criterion setting unit 36 makes the threshold value higher and prioritizes the reduction of the electric power consumption over the image quality of the captured image.

When the operation information indicates ongoing camera shake correction operation, it is difficult to obtain a high quality captured image at the time of camera shake, and therefore the determination criterion setting unit 36 makes the threshold value higher and prioritizes the reduction of the electric power consumption over the image quality of the captured image.

Also, when the operation information indicates an image capturing time period, the determination criterion setting unit 36 makes the threshold value higher and prioritizes the reduction of the electric power consumption over the image quality of the captured image, in the image capturing within the time period having no importance on the captured image for example.

Also, the determination criterion setting unit 36 may set the threshold value in accordance with the battery remaining power indicated by the operation information, and reduce the electric power consumption. Note that the battery remaining power is detected by the operation control unit 50 for example.

Further, the imaging operation time is set, and the operation information indicates the battery remaining power and the operation time to the imaging operation end. In this case, the determination criterion setting unit 36 may make the threshold value higher and reduce the electric power consumption, to enable the imaging operation until the imaging end, on the basis of the battery remaining power and the operation time and the estimated electric power consumption until the imaging operation end.

Also, a case in which the determination criterion setting unit 36 sets the threshold value on the basis of the operation information is not a limitation, and the threshold value may be changed by controlling the designated electric power consumption by the designated electric power consumption calculation unit 44 on the basis of the operation information.

Further, the determination criterion setting unit 36 is not limited to setting the threshold value for each screen image, but may set the threshold value for each pixel or for each pixel region composed of a plurality of adjacent pixels. Also, the threshold value setting for each pixel or for each pixel region and the threshold value setting over the entire image may be combined. When the threshold value setting for each pixel or for each pixel region and the threshold value setting over the entire image are combined, a uniform threshold value over the entire screen image is calculated as an absolute value, and a difference value from the uniform threshold value over the entire screen image is calculated in the calculation of the threshold value for each pixel or for the pixel region, and a summed result is applied to each pixel, for example. Also, the difference value of each pixel is not a limitation, but the implementation method is not limited thereto, for example by specifying a proportion.

When the threshold value is set for each pixel or for pixel region, the determination criterion setting unit 36 sets the threshold value in accordance with what position the pixel of interest is in the screen image. The determination criterion setting unit 36 makes the threshold value lower in such a manner that the image quality does not decrease at a screen image center portion for example, and make the threshold value higher at a screen image peripheral portion to reduce the electric power consumption. If the threshold value is controlled as described above, the electric power consumption can be reduced, while maintaining the screen image center portion in the high image quality state.

Also, when a desired imaging object is captured, the desired imaging object is captured to be as bright as the background or brighter than the background, in many cases. Thus, the determination criterion setting unit 36 makes the threshold value lower in a bright image region, and make the threshold value higher in a dark image region. In this way, the electric power consumption can be reduced, while maintaining the desired imaging object in the high image quality state.

Further, when the image capturing apparatus captures scenery, the sky is at an upper position of the image, for example. Thus, when the operation mode of the image capturing apparatus is a scenery mode, the determination criterion setting unit 36 can generate the captured image little influenced by the decrease of the image quality, by making the threshold value higher at the upper position of the image to reduce the electric power consumption. Also, when a face of a person is recognized by imaging object recognition for example, the electric power consumption can be reduced, while maintaining the recognized imaging object in the high image quality state, by making the threshold value lower in the region of the face of the person.

Also, although in the above first and second embodiments the A/D conversion operation is controlled on the basis of the signal generation pixel determination information, the signal generation control unit 34 may control the operation of the image sensor drive unit 22 and control such that the image sensor 21 does not generate the pixel signal of the decimated pixel. Also, when the operation of the image sensor drive unit 22 and the A/D conversion unit 23 is controlled on the basis of the signal generation pixel determination information, the electric power consumption can be further reduced.

Further, a series of processing described in the specification can be executed by hardware, software, or a combined configuration thereof. In a case of executing processing using software, a program in which a processing sequence is recorded is installed and executed in a memory in a computer included in dedicated hardware. Alternatively, it is possible to install and execute a program in a general-purpose computer capable of executing various kinds of processing.

For example, the program can previously be recorded in a hard disk drive, SSD (Solid State Drive), or ROM (Read Only Memory) as a recording medium. Or the program can temporarily or permanently be stored (recorded) in a removable medium such as a flexible disk, CD-ROM (Compact Disc Read Only Memory), MO (Magneto optical) disk, DVD (Digital Versatile Disc), BD (Blu-Ray Disc (registered trademark)), magnetic disk, semiconductor memory card. Such a removable recording medium can be provided as so-called packaged software.

Moreover, the program not only be installed in the computer form the removable recording medium but also may be installed by wireless or wired transferring into the computer via a network such as a LAN (Local Area Network) and the Internet from download sites. The computer can undergo installation of the received program, which is transferred like that, into the recording medium such as the mounted hard disk drive.

Note that the effects described in the present specification are merely examples, and not limitative; additional effects that are not described may be exhibited. It should be understood by those skilled in the art that various modifications, combinations, sub-combinations and alterations may occur depending on design requirements and other factors insofar as they are within the scope of the appended claims or the equivalents thereof.

Additionally, an image processing apparatus of the present technology may also be configured as below.

(1)
An image processing apparatus including:
an interpolation processing unit that performs an interpolation process of a decimated pixel in an image signal;
a signal generation pixel determination unit that calculates a feature value of a pixel of interest from the image signal to which the interpolation process is performed by the interpolation processing unit, and determines whether the pixel of interest is a decimated pixel or a non-decimated pixel on the basis of the calculated feature value, and generates signal generation pixel determination information indicating a determination result; and
a signal generation control unit that performs control to stop signal generation operation of the pixel that is determined to be the decimated pixel by the signal generation pixel determination information generated by the signal generation pixel determination unit, at a time of subsequent generation of an image signal.

(2)
The image processing apparatus according to (1), in which
the feature value is information indicating a flatness of a region of the pixel of interest.

(3)
The image processing apparatus according to (2), in which
a dynamic range of a signal in a predetermined area with respect to the pixel of interest or a sum of absolute differences between the pixel of interest and adjacent pixels is used as the feature value.

(4)
The image processing apparatus according to any one of (1) to (3), further including:
a determination criterion setting unit that sets a threshold value in accordance with a pixel position of the pixel of interest,
in which the signal generation pixel determination unit compares the feature value of the pixel of interest with the threshold value, and generates the signal generation pixel determination information on the basis of a comparison result.

(5)
The image processing apparatus according to any one of (1) to (4), further including:
a scaler unit that sets the signal generation pixel determination information to signal generation pixel determination information corresponding to an image size of an image signal generated subsequently, in a case where the image size differs between the image signal used in the generation of the signal generation pixel determination information and the image signal generated subsequently.

(6)
The image processing apparatus according to any one of (1) to (5), further including:
an A/D conversion unit that performs an analog/digital conversion process of an image signal from an image sensor that generates the image signal based on an imaging object optical image,
in which the interpolation processing unit performs the interpolation process by using the image signal to which the analog/digital conversion process is performed by the A/D conversion unit, and
the signal generation control unit controls the A/D conversion unit on the basis of the signal generation pixel determination information, to stop the analog/digital conversion process to the pixel determined to be the decimated pixel.

(7)
The image processing apparatus according to any one of (1) to (6), further including:
an image sensor drive unit that drives an image sensor that generates an image signal based on an imaging object optical image,
in which the signal generation control unit controls the image sensor drive unit on the basis of the signal generation pixel determination information, to stop generation of a signal of the pixel determined to be the decimated pixel.

Additionally, an image capturing apparatus of the present technology may also be configured as below.

(1)
An image capturing apparatus including:
an image sensor that generates an image signal based on an imaging object optical image;
an interpolation processing unit that performs an interpolation process of the image signal generated by the image sensor;
a signal generation pixel determination unit that calculates a feature value of a pixel of interest from the image signal to which the interpolation process is performed by the interpolation processing unit, and determines whether the pixel of interest is a decimated pixel or a non-decimated pixel on the basis of the calculated feature value, and generates signal generation pixel determination information indicating a determination result; and
a signal generation control unit that performs control to stop signal generation operation of the pixel that is determined to be the decimated pixel by the signal generation pixel determination information generated by the signal generation pixel determination unit, at a time of subsequent generation of an image signal.

(2)
The image capturing apparatus according to (1), further including:
an operation control unit that performs control of imaging operation; and
a determination criterion setting unit that sets a threshold value in accordance with an image capturing operating state,
in which the signal generation pixel determination unit determines whether the pixel of interest is the decimated pixel on the basis of a comparison result between the feature value and the threshold value, and sets the threshold value in accordance with the image capturing operating state.

(3)
The image capturing apparatus according to (2), in which
the operation control unit displays a preview image before capturing a still image, and the determination criterion setting unit changes the threshold value, depending on still image capturing or preview image displaying.

(4)

The image capturing apparatus according to (2) or (3), in which the operation control unit performs camera shake correction operation, and the determination criterion setting unit changes the threshold value, depending on performing or not performing the camera shake correction operation.

(5)

The image capturing apparatus according to any one of (2) to (4), in which the operation control unit performs imaging object detection operation, and the determination criterion setting unit sets the threshold value in accordance with an imaging object detection result in the operation control unit.

(6)

The image capturing apparatus according to (5), in which the determination criterion setting unit sets the threshold value to reduce pixels for which signal generation is performed, in a case of determining that an imaging object is not a predetermined imaging object or in a case of determining that a motion of the imaging object is faster than a predetermined speed, on the basis of the imaging object detection result.

(7)

The image capturing apparatus according to any one of (2) to (6), in which the determination criterion setting unit sets the threshold value in accordance with an imaging mode or a brightness of an imaging object.

(8)

The image capturing apparatus according to any one of (2) to (6), in which the determination criterion setting unit sets the threshold value in accordance with an output mode of the image signal to which the interpolation process is performed by the interpolation processing unit.

(9)

The image capturing apparatus according to any one of (1) to (8), further including:

a clock unit that acquires time information, in which the determination criterion setting unit sets the threshold value in accordance with an image capturing time.

(10)

The image capturing apparatus according to any one of (1) to (9), further including:

an electric power consumption estimation unit that estimates an electric power consumption by using the signal generation pixel determination information generated by the signal generation pixel determination unit, in which the determination criterion setting unit sets the threshold value in accordance with a comparison result between a designated electric power consumption and the estimated electric power consumption estimated by the electric power consumption estimation unit.

(11)

The image capturing apparatus according to any one of (1) to (10), further including:

a remaining power detection unit that detects a remaining power of a battery for operating the image capturing apparatus, in which the determination criterion setting unit sets the threshold value in accordance with a detection result of the remaining power detection unit.

(12)

The image capturing apparatus according to (11), further including:

an electric power consumption estimation unit that estimates an electric power consumption by using the signal generation pixel determination information generated by the signal generation pixel determination unit, in which the determination criterion setting unit sets the threshold value to enable imaging operation until an imaging end, on the basis of time until the imaging end, the detection result of the remaining power detection unit, and an estimation result of the electric power consumption estimation unit.

INDUSTRIAL APPLICABILITY

In the image processing apparatus, the image processing method, and the image capturing apparatus of this technology, the interpolation process of the decimated pixel in the image signal is performed, and the feature value of the pixel of interest is calculated from the image signal to which the interpolation process is performed. Also, whether the pixel of interest is the decimated pixel or the non-decimated pixel is determined on the basis of the calculated feature value, and the signal generation pixel determination information indicating the determination result is generated. The control is performed so as not to generate the signal of the pixel that is determined to be the decimated pixel by the signal generation pixel determination information, at the time of the subsequent generation of the image signal. Thus, the degradation of the image quality is prevented, and the electric power consumption is reduced, and it is suitable for a portable electronic device or the like that has an imaging function, for example.

REFERENCE SIGNS LIST 10, 10a, 10b image capturing apparatus
20 imaging unit
21 image sensor
22 image sensor drive unit
23 A/D conversion unit
30 image processing unit
31 interpolation processing unit
32 signal generation pixel determination unit
33 scaler unit
34 signal generation control unit
35, 36 determination criterion setting unit
40 camera signal processing unit
41 user interface (I/F) unit
42 clock unit
43 electric power consumption estimation unit
44 designated electric power consumption calculation unit
45 sensor unit
50 operation control unit

The invention claimed is:

1. An image processing apparatus, comprising:
an interpolation processing unit that performs an interpolation process of a decimated pixel in an image signal;
a signal generation pixel determination unit that calculates a feature value of a pixel of interest from the image signal to which the interpolation process is performed by the interpolation processing unit, and determines whether the pixel of interest is the decimated pixel or a non-decimated pixel based on the calculated feature value, and generates signal generation pixel determination information indicating a determination result; and a signal generation control unit that performs control to stop signal generation operation of the pixel that is determined to be the decimated pixel by the signal generation pixel determination information generated by the signal generation pixel determination unit, at a time of subsequent generation of a subsequent image signal.

2. The image processing apparatus according to claim 1, wherein
the feature value is information indicating a flatness of a region of the pixel of interest.

3. The image processing apparatus according to claim 2, wherein
a dynamic range of a signal in a predetermined area with respect to the pixel of interest or a sum of absolute differences between the pixel of interest and adjacent pixels is used as the feature value.

4. The image processing apparatus according to claim 1, further comprising:
a determination criterion setting unit that sets a threshold value in accordance with a pixel position of the pixel of interest,
wherein the signal generation pixel determination unit compares the feature value of the pixel of interest with the threshold value, and generates the signal generation pixel determination information based on a comparison result.

5. The image processing apparatus according to claim 1, further comprising:
a scaler unit that sets the signal generation pixel determination information to signal generation pixel determination information corresponding to an image size of the subsequent image signal generated subsequently, in a case where the image size differs between the image signal used in the generation of the signal generation pixel determination information and the subsequent image signal generated subsequently.

6. The image processing apparatus according to claim 1, further comprising:
an A/D conversion unit that performs an analog/digital conversion process of the image signal from an image sensor that generates the image signal based on an imaging object optical image,
wherein the interpolation processing unit performs the interpolation process by using the image signal to which the analog/digital conversion process is performed by the A/D conversion unit, and
the signal generation control unit controls the A/D conversion unit based on the signal generation pixel determination information, to stop the analog/digital conversion process to the pixel determined to be the decimated pixel.

7. The image processing apparatus according to claim 1, further comprising:
an image sensor drive unit that drives an image sensor that generates the image signal based on an imaging object optical image,
wherein the signal generation control unit controls the image sensor drive unit based on the signal generation pixel determination information, to stop generation of a signal of the pixel determined to be the decimated pixel.

8. An image processing method, comprising:
performing, by an interpolation processing unit, an interpolation process of a decimated pixel in an image signal;
calculating, by a signal generation pixel determination unit, a feature value of a pixel of interest from the image signal after the interpolation process, and determining whether the pixel of interest is the decimated pixel or a non-decimated pixel based on the calculated feature value, and generating signal generation pixel determination information indicating a determination result; and
performing control, by a signal generation control unit, to stop signal generation operation of the pixel that is determined to be the decimated pixel by the signal generation pixel determination information generated by the signal generation pixel determination unit, at a time of subsequent generation of a subsequent image signal.

9. An image capturing apparatus, comprising:
an image sensor that generates an image signal based on an imaging object optical image;
an interpolation processing unit that performs an interpolation process of the image signal generated by the image sensor;
a signal generation pixel determination unit that calculates a feature value of a pixel of interest from the image signal to which the interpolation process is performed by the interpolation processing unit, and determines whether the pixel of interest is a decimated pixel or a non-decimated pixel based on the calculated feature value, and generates signal generation pixel determination information indicating a determination result; and
a signal generation control unit that performs control to stop signal generation operation of the pixel that is determined to be the decimated pixel by the signal generation pixel determination information generated by the signal generation pixel determination unit, at a time of subsequent generation of a subsequent image signal.

10. The image capturing apparatus according to claim 9, further comprising:
an operation control unit that performs control of imaging operation; and
a determination criterion setting unit that sets a threshold value in accordance with an image capturing operating state,
wherein the signal generation pixel determination unit determines whether the pixel of interest is the decimated pixel based on a comparison result between the feature value and the threshold value, and sets the threshold value in accordance with the image capturing operating state.

11. The image capturing apparatus according to claim 10, wherein
the operation control unit displays a preview image before capturing a still image, and
the determination criterion setting unit changes the threshold value, depending on still image capturing or preview image displaying.

12. The image capturing apparatus according to claim 10, wherein
the operation control unit performs camera shake correction operation, and
the determination criterion setting unit changes the threshold value, depending on performing or not performing the camera shake correction operation.

13. The image capturing apparatus according to claim 10, wherein
the operation control unit performs imaging object detection operation, and
the determination criterion setting unit sets the threshold value in accordance with an imaging object detection result in the operation control unit.

14. The image capturing apparatus according to claim 13, wherein
the determination criterion setting unit sets the threshold value to reduce pixels for which signal generation is performed, in a case of determining that an imaging object is not a predetermined imaging object or in a case of determining that a motion of the imaging object is faster than a predetermined speed, based on the imaging object detection result.

15. The image capturing apparatus according to claim 10, wherein
the determination criterion setting unit sets the threshold value in accordance with an imaging mode or a brightness of an imaging object.

16. The image capturing apparatus according to claim 10, wherein
the determination criterion setting unit sets the threshold value in accordance with an output mode of the image signal to which the interpolation process is performed by the interpolation processing unit.

17. The image capturing apparatus according to claim 10, further comprising:
a clock unit that acquires time information,
wherein the determination criterion setting unit sets the threshold value in accordance with an image capturing time.

18. The image capturing apparatus according to claim 10, further comprising:
an electric power consumption estimation unit that estimates an electric power consumption by using the signal generation pixel determination information generated by the signal generation pixel determination unit,
wherein the determination criterion setting unit sets the threshold value in accordance with a comparison result between a designated electric power consumption and the estimated electric power consumption estimated by the electric power consumption estimation unit.

19. The image capturing apparatus according to claim 10, further comprising:
a remaining power detection unit that detects a remaining power of a battery for operating the image capturing apparatus,
wherein the determination criterion setting unit sets the threshold value in accordance with a detection result of the remaining power detection unit.

20. The image capturing apparatus according to claim 19, further comprising:
an electric power consumption estimation unit that estimates an electric power consumption by using the signal generation pixel determination information generated by the signal generation pixel determination unit,
wherein the determination criterion setting unit sets the threshold value to enable imaging operation until an imaging end, based on time until the imaging end, the detection result of the remaining power detection unit, and an estimation result of the electric power consumption estimation unit.

* * * * *